United States Patent
Weeber et al.

(10) Patent No.: US 10,497,945 B2
(45) Date of Patent: Dec. 3, 2019

(54) PROCESS FOR PRODUCING A DISTRIBUTOR PLATE FOR AN ELECTROCHEMICAL SYSTEM AND DISTRIBUTOR PLATE FOR AN ELECTROCHEMICAL SYSTEM

(71) Applicant: Robert Bosch GmbH, Stuttgart (DE)

(72) Inventors: Kai Weeber, Heimsheim (DE); Silvan Hippchen, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 15/583,349

(22) Filed: May 1, 2017

(65) Prior Publication Data
US 2017/0317359 A1    Nov. 2, 2017

(30) Foreign Application Priority Data
May 2, 2016    (DE) .................. 10 2016 207 500

(51) Int. Cl.
| | |
|---|---|
| *H01M 8/026* | (2016.01) |
| *H01M 8/0267* | (2016.01) |
| *H01M 8/2483* | (2016.01) |
| *C25D 7/00* | (2006.01) |
| *C25F 1/00* | (2006.01) |
| *C25F 3/14* | (2006.01) |
| *H01M 8/0263* | (2016.01) |
| *C25D 1/00* | (2006.01) |
| *C25D 5/02* | (2006.01) |
| *C25D 5/34* | (2006.01) |
| *H01M 8/0206* | (2016.01) |
| *H01M 8/0258* | (2016.01) |

(52) U.S. Cl.
CPC ............ *H01M 8/026* (2013.01); *C25D 1/003* (2013.01); *C25D 5/022* (2013.01); *C25D 5/34* (2013.01); *C25D 7/00* (2013.01); *C25F 1/00* (2013.01); *C25F 3/14* (2013.01); *H01M 8/0206* (2013.01); *H01M 8/0258* (2013.01); *H01M 8/0263* (2013.01); *H01M 8/0267* (2013.01); *H01M 8/2483* (2016.02)

(58) Field of Classification Search
CPC .. H01M 8/026; H01M 8/0263; H01M 8/0267; H01M 8/2483; C25D 1/003
USPC ........................................................ 429/512
See application file for complete search history.

(56) References Cited

U.S. PATENT DOCUMENTS

| | | | | |
|---|---|---|---|---|
| 2009/0011310 A1* | 1/2009 | Trabold | .............. | H01M 8/0245 429/457 |
| 2009/0130607 A1* | 5/2009 | Slafer | .................... | B82Y 10/00 430/323 |

(Continued)

*Primary Examiner* — Basia A Ridley
*Assistant Examiner* — James M Erwin
(74) *Attorney, Agent, or Firm* — Michael Best & Friedrich LLP

(57) ABSTRACT

A process (30) for producing a distributor plate (1) for an electrochemical system, wherein the distributor plate (1) has at least one metal foil (2) having a first surface (3) and a second surface (4) and the process (30) has the following process steps:
a) pretreatment (31) of the metal foil (2);
b) mask formation (32) at least on the first surface (3) of the pretreated metal foil (2);
c) structure formation (33) at least on the first surface (3) of the metal foil (2) provided with the mask (10), as a result of which a first fluid distributor structure (5) is formed;
d) mask removal (36).

9 Claims, 4 Drawing Sheets

(56) References Cited

U.S. PATENT DOCUMENTS

2011/0076590 A1* 3/2011 Kozakai .............. H01M 8/0258
429/480
2012/0031765 A1* 2/2012 Curran ................... B05D 3/142
205/50

* cited by examiner

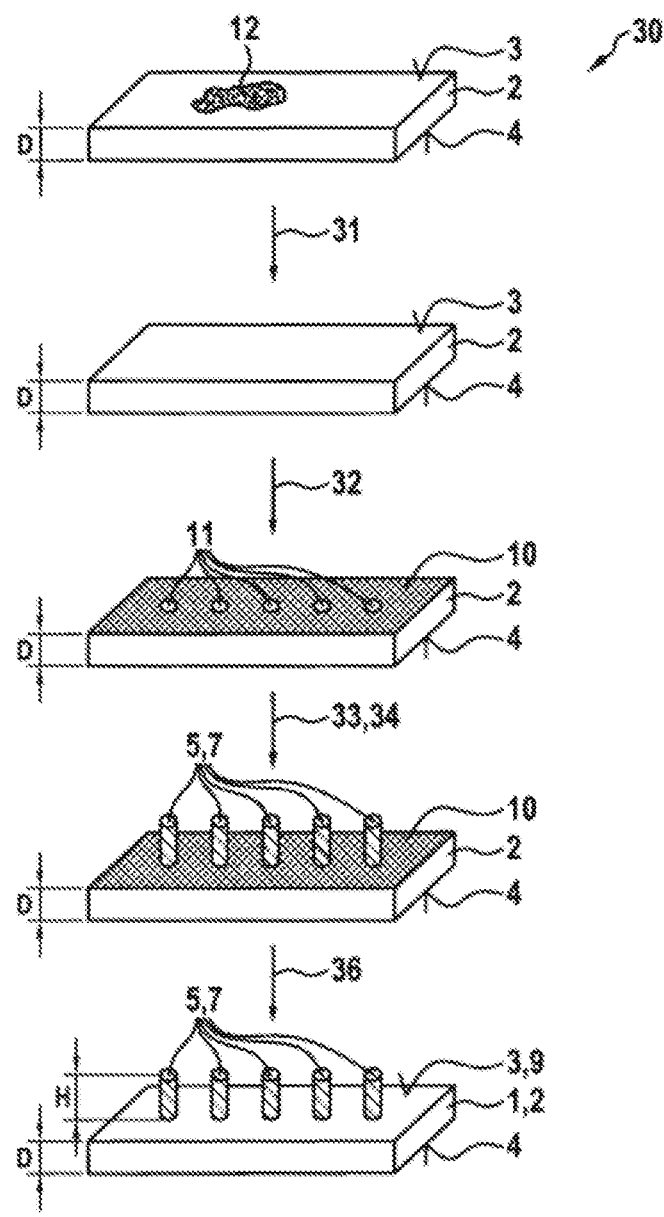

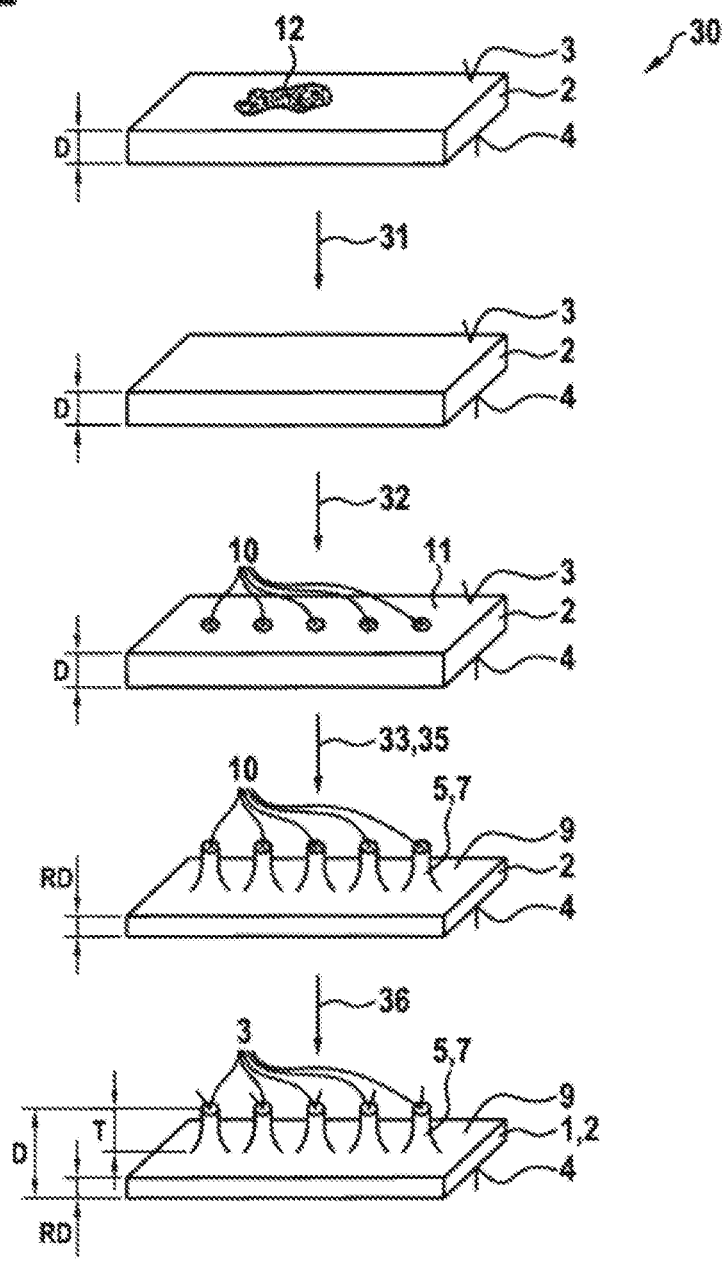

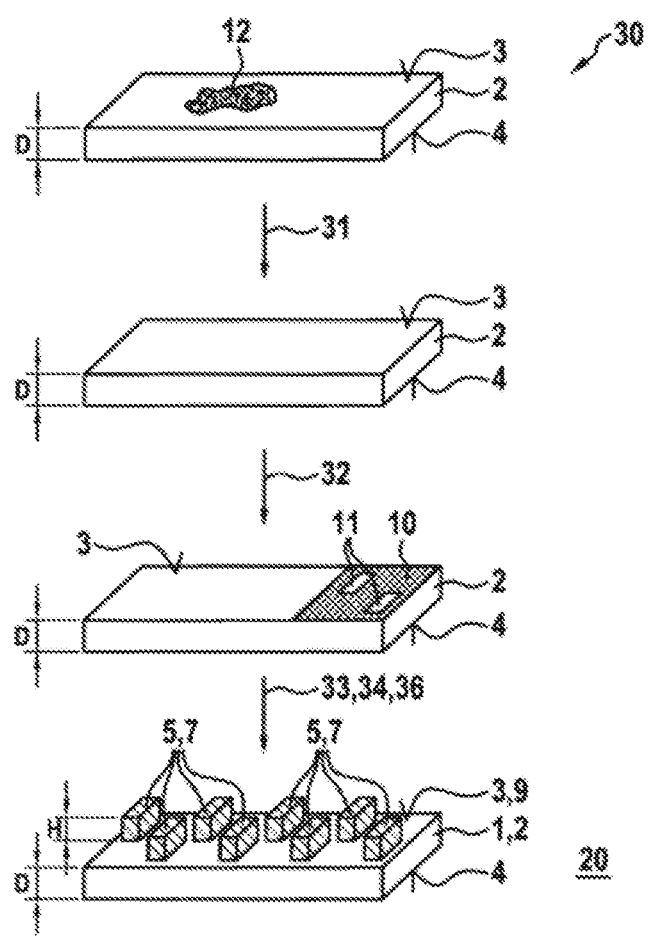

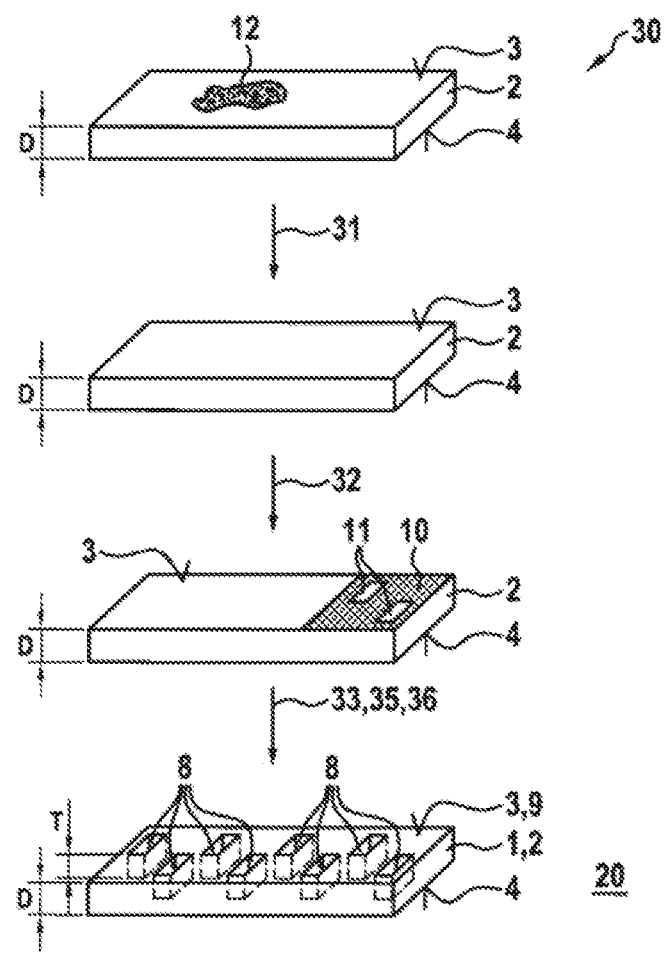

PROCESS FOR PRODUCING A DISTRIBUTOR PLATE FOR AN ELECTROCHEMICAL SYSTEM AND DISTRIBUTOR PLATE FOR AN ELECTROCHEMICAL SYSTEM

BACKGROUND OF THE INVENTION

The invention relates to a process for producing a distributor plate for an electrochemical system and also a distributor plate for an electrochemical system.

Fuel cells are electrochemical energy converters in which reaction gases, for example hydrogen ($H_2$), (as fuel) and oxygen ($O_2$) are converted into water ($H_2O$), i.e. chemical energy is converted into electric energy and heat. In the case of PEM fuel cells (polymer electrolyte membrane fuel cells), a plurality of fuel cells are usually positioned on top of one another to form a fuel cell stack. The reaction gases hydrogen and the oxygen from the air and also cooling liquid are conveyed via a media distributor structure into the fuel cells. This media distributor structure is configured either as channel or as electrically conductive porous layer (foam). The channel media distributor structure and the foam media distributor structure with the seal are parts of the bipolar plate of a PEM fuel cell. Apart from the membrane, the bipolar plate is a very costly component of the fuel cell and in the current state of manufacturing technology makes up from 30 to 45% of the fuel cell stack costs. The reasons are the surfaces provided with fine groove structures together with a very low residual wall thickness of the bipolar plate. At the same time, the material of the bipolar plate has to withstand an active and very demanding chemical environment without corrosion or membrane-damaging ion leaching occurring. These far-reaching specifications which the bipolar plates and their materials have to meet lead to the use of very expensive materials and also complicated processing methods which keep the costs of the bipolar plates at a permanently high level. In this respect, the development of alternative and more efficient production methods in the production of the bipolar plates is of great importance.

SUMMARY OF THE INVENTION

The invention provides a process for producing a distributor plate for an electrochemical system, in particular in the form of at least one fuel cell, and also a distributor plate. Here, it has been found to be advantageous that known disadvantages of the prior art are at least partly overcome. In particular, the process of the invention for producing a distributor plate and the distributor plate of the invention are extremely practical, simple and inexpensive to use. Further features and details of the invention can be derived from the claims, the description and the drawings. Here, the features and details which are described in connection with the process of the invention of course also apply in connection with the distributor plate of the invention and in each case vice versa, so that reciprocal reference is or can be always made to the individual aspects of the invention in respect of disclosure.

The invention provides a process for producing a distributor plate for an electrochemical system, in particular in the form of at least one fuel cell, wherein the distributor plate has at least one metal foil having a first surface and a second surface and the process has the following process steps:
a) pretreatment of the metal foil;
b) mask formation at least on the first surface of the pretreated metal foil;
c) structure formation at least on the first surface of the metal foil provided with the mask, as a result of which a first fluid distributor structure is formed;
d) mask removal.

Such a distributor plate can be configured as bipolar plate, bipolar plate half-plate, monoplate or end plate for an electrochemical system. A fluid distributor structure is also referred to as flow field. Such an electrochemical system can be at least one fuel cell or a plurality of fuel cells which are assembled to form a fuel cell stack, in particular for a motor vehicle, or an electrolyzer or an electrochemical compressor. The metal foil generally has a thickness of from 10 μm to 1000 μm, preferably from 100 μm to 200 μm, so that the thickness of the metal foil is in the μm range. It has been found to be extremely advantageous that the distributor plate is significantly thinner compared to the distributor plate from the prior art (milled channel media distributor structure or foam media distributor structure of the bipolar plate, which have thicknesses of several mm), so that the fuel cell stack is significantly thinner, narrower, lighter and more compact but the height of the structure is still sufficient to ensure optimal gas flow or optimal fluid distribution. The structural design can also be specifically configured for optimal fluid distribution in the stack. The elements applied can thus influence the fluid flow by means of their shape and direct it in desired directions. In addition, distributor plates can be produced automatically and reproducibly, inexpensively and in large numbers by means of this process.

A second fluid distributor structure can preferably be formed by the structure formation on the second surface of the metal foil. This second fluid distributor structure can be configured differently than the first fluid distributor structure or be (structurally) identical to the first fluid distributor structure. Thus, the metal foil has fluid distributor structures on both its surfaces so that the metal foil as bipolar plate can be made extremely thin and the function as media distributor structure is optimally ensured. It is also conceivable for the metal foil to have only the first fluid distributor structure on its first surface and the distributor plate accordingly to comprise two metal foils each having a fluid distributor structure. There are therefore more possibilities for configuring the fuel cell stack according to requirements and its use.

Chemical or electrochemical cleaning or degreasing can preferably firstly take place for the pretreatment of the metal foil. For the purposes of the present invention, chemical cleaning or degreasing is, for example, hot degreasing. For the purposes of the present invention, electrochemical cleaning or degreasing is, for example, electrolytic degreasing. In hot degreasing, use is generally made of basic cleaning solutions which dissolve stubborn soiling from the surface of the workpiece or the metal foil and chemically bind the dissolved contamination, so that, in particular, emulsification takes place. In electrolytic degreasing, use is generally also made of basic cleaning solutions as in hot degreasing. In electrolytic degreasing, an applied current or voltage (anodic or cathodic mode) has a significant cleaning effect on the workpiece or the metal foil. In the anodic mode, oxygen gas is formed on the workpiece or the metal foil. In the cathodic mode, hydrogen gas is formed on the workpiece or the metal foil. Depending on the process steps for structure formation which are subsequently to take place, further pretreatments can be carried out on the metal foil. For example, in the case of later coating in structure formation, the metal foil can, in the pretreatment, be treated with distilled water and acid solutions after cleaning or degreasing. The metal foil is thus pretreated in order to assist further process steps to take place on the pretreated metal foil.

It is conceivable for lithography or a prefabricated mask to be used in a band plant for mask formation. The mask can be applied to the surface of the metal foil by lithography preceding structure formation. A lithographic mask formed in this way makes it possible to carry out further processing by chemical and physical processes, for instance introduction of material in mask-free places or etching of depressions under the mask-free places. Thus, lithography gives high accuracy and high productivity. As an alternative, the prefabricated mask can be used in the band plant. The band plant is also referred to as reel-to-reel plant. The fluid distribution structure can be built up precisely on the surface of the metal foil by the mask formation.

The structure formation can preferably be effected by electrochemical coating or wet-chemical or electrochemical etching, in particular with structure formation being able to be effected by electrochemical coating or wet-chemical or electrochemical etching in the band plant.

For the purposes of the invention, electrochemical technology (also referred to as electroplating) is the electrochemical deposition of metal deposits (coatings) on substrates or the metal foil in the present invention. Electrochemical coating is advantageously characterized in that a surface structure can be replicated or molded in detail, precisely and accurately, so that electrochemical coating functions as a precise process for structuring the surfaces of the metal foil. Surface structures of the metal foil are replicated accurately and precisely by means of various parameters, for example deposition rates, current intensity and deposition time.

For the purposes of the invention, "etching" is the (chemical) removal of material of the metal foil in the form of depressions on the surface of the metal foil by use of etchants. A significant advantage of the wet-chemical etching process is the usually simple and controllable way of carrying out the process. The achievable selectivity of the etching process is high, and contamination and damage to the etched surface is low. The wet-chemical etching process displays good uniformity and reproducibility. Parameters which determined the etching process and its reproducibility are the etching rate, the etching time, the temperature and the operating life of the etching solution.

In electrochemical etching, the pretreated metal foil in the etching liquid can be connected to the positive pole of a direct current source, as a result of which the etching operation is greatly accelerated.

The continuous etching process in the band plant is highly suitable for very accurate maintenance of the etching depth. It is therefore ideal for surface structuring of the metal foil. The precise maintenance of the etching depth allows metal surfaces having a wide variety of geometries and properties to be structured. Thus, individual customer solutions on an industrial scale are guaranteed.

The metal foil can be economically structured as strip by etching or coating using a continuous in-line process in the band plant. Here, the metal foil strip is rolled off from the roll and then conveyed through all stations of the etching or coating process. At the end, the structured metal foil strip is then wound up on reels. This process thus operates from one roll of the pretreated metal foil strip to the roll of the structured metal foil strip on a reel, or in brief: reel-to-reel. The flexibility of the metal foil offers an optimal prerequisite for the possible use in such a continuous production plant/band plant. The length and width of the continuous metal foil strip in the band plant can vary as a function of the product size required by the customer. Furthermore, this process has a high degree of automation.

The electrochemical coating in the band plant can advantageously comprise full-area and/or selective dipped coating and/or selective brush coating and/or selective tape coating in a strip module of the band plant and/or spot coating in a spot module of the band plant and the like. Due to this large number of use possibilities in the band plant, individual customer solutions can be offered.

The invention likewise provides a distributor plate for an electrochemical system, wherein the distributor plate has at least one metal foil having a first surface and a second surface and at least one first fluid distributor structure is formed by structure formation on the first surface of the metal foil. A distributor plate according to the invention results in advantages, in particular in terms of production costs due to its thin configuration. Such a distributor plate can be configured as bipolar plate, bipolar plate half-plate, monopolar plate or end plate for an electrochemical system, as described above. The distributor plate can preferably have two of the metal foils, with the metal foils being able to be joined to one another. It is also conceivable for a second fluid distributor structure to be formed by the structure formation on the second surface of the metal foil.

The metal foil can advantageously be formed by a metal such as steel, stainless steel, nickel, aluminum, titanium or the like, with the metal foil being able to be, in particular, corrosion-resistant. Stainless steel has corrosion resistance and is thus suitable as material of the metal foil. It is conceivable for the metal foil to be coated with a corrosion-resistant metal, so that the distributor plate becomes corrosion-resistant. The production costs of the distributor plate are reduced further by such resource-conserving coating.

It is also conceivable for the first and/or second fluid distributor structure(s) to have a meandering or egg carton-like or honeycomb-like or linear or finger-like or spiral or circular or other topology. The function of uniform and full-area fluid distribution can be optimally achieved by means of the various topologies of the distributor plate.

Discrete and spaced raised regions or depressions, which, in particular, project from or sink into a flat areal section and are uniformly distributed over the areal section, can preferably be distributed over the first and/or second surface(s) of the metal foil, as a result of which the first and/or second fluid distributor structure(s) can be formed. Due to the discrete, uniformly distributed and spaced raised regions or depressions in the µm range, fluids can, in particular, be distributed uniformly over the full area of a catalyst layer of the fuel cell in order to bring about energy conversion with a high efficiency.

It is likewise conceivable for the distributor plate to have a thickness of from 10 µm to 1000 µm, preferably from 100 µm to 200 µm, in particular with the first fluid distributor structure being able to have a height or depth relative to the first surface of the metal foil of from 0.1 µm to 100 µm, preferably from 1 µm to 20 µm, in particular with the second fluid distributor structure being able to have a height or depth relative to the second surface of the metal foil of from 0.1 µm to 100 µm, preferably from 1 µm to 20 µm, in particular with the raised regions and depressions of the first and/or second fluid distributor structure(s) being able to be in the order of magnitude of from 0.1 µm to 100 µm, preferably from 1 µm to 20 µm. The production costs of the distributor plate or the fuel cell can be reduced further by the thin configuration of the metal foil.

In addition, a process according to the invention can be used for the distributor plate according to the invention, which results in the abovementioned advantages.

Furthermore, the invention provides an electrochemical system, in particular a fuel cell, in particular of a motor vehicle, or an electrolyzer or an electrochemical compressor, wherein the electrochemical system comprises at least one distributor plate according to the invention.

In addition, the invention provides a use of a distributor plate according to the invention which is used in an electrochemical system such as a fuel cell, in particular of a motor vehicle, or an electrolyzer or an electrochemical compressor.

To avoid repetition in respect of further advantages of the distributor plate of the invention, of the electrochemical system of the invention and of the use according to the invention of a distributor plate, reference is made to the description of the process of the invention and this is fully incorporated by reference. This also applies conversely to the process, so that reference will be made to the description of the distributor plate of the invention in respect of further advantages of the process of the invention and that description is fully incorporated by reference.

BRIEF DESCRIPTION OF THE DRAWINGS

Preferred Working Examples

Further measures which improve the invention may be derived from the following description of a working example of the invention which is shown schematically in the figures. All features and/or advantages which can be derived from the claims, the description or the drawing, including structural details, three-dimensional arrangements and process steps, can be important for the invention both alone and also in a variety of combinations. It should be noted here that the figures have only a descriptive character and are not intended to restrict the invention in any way. The figures schematically show:

FIG. 1 a first working example of a process, in which electrochemical coating is used, FIG. 2 a further working example of a process in which wet-chemical etching is used, FIG. 3 a further working example of a process in the spot module of a band plant, in which electrochemical coating is used, FIG. 4 a further working example of a process in the spot module of a band plant, in which wet-chemical etching is used.

DETAILED DESCRIPTION

In the various figures, identical parts are always denoted by the same reference symbols, for which reason these are generally described only once.

FIG. 1 schematically shows a process 30 for producing a distributor plate 1 for an electrochemical system. The distributor plate 1 has at least one metal foil 2 having a first surface 3 and a second surface 4, with soiling 12 being present on the first surface 3 of the metal foil 2. The distributor plate 1 has a thickness of from 10 µm to 1000 µm, preferably from 100 µm to 200 µm.

The process 30 comprises the following process steps:
a) pretreatment 31 of the metal foil 2;
b) mask formation 32 at least on the first surface 3 of the pretreated metal foil 2;
c) structure formation 33 at least on the first surface 3 of the metal foil 2 provided with the mask or structure pattern 10, as a result of which a first fluid distributor structure 5 is formed; and
d) mask removal 36.

As can be seen from FIG. 1, the metal foil 2 is cleaned after the pretreatment 31, i.e. possible soiling 12 is firstly removed from the first surface 3 and/or the second surface 4 of the metal foil 2. Lithography is used here for mask formation 32, as a result of which the mask 10 is formed on the first surface 3 of the metal foil 2. The mask 10 is depicted shaded in FIG. 1, while mask-free places 11 are shown as points. It is conceivable for the mask 10 also to be formed simultaneously on the second surface 4 of the metal foil 2. Electrochemical coating 34 is used here for structure formation 33. During the structure formation 33, electrochemical coating 34 takes place at the point-like mask-free places on the first surface 3 of the metal foil 2, as a result of which raised regions 7 are formed. The raised regions 7 are, by way of example, shown hatched as perpendicular circular cylinders which project from the first surface 3 of the metal foil 2 in FIG. 1. The raised regions 7 have, for example, an order of magnitude of from 0.1 µm to 100 µm, preferably from 1 µm to 20 µm, so that the first fluid distributor structure 5 formed thereby has a height H relative to the first surface 3 of the metal foil 2 of from 0.1 µm to 100 µm, preferably from 1 µm to 20 µm. Mask removal 36 subsequently takes place, so that the mask 10 is removed from the first surface 3 of the metal foil 2. The distributor plate or the metal foil have, for example, a thickness D of from 10 µm to 1000 µm, preferably from 100 µm to 200 µm.

FIG. 2 schematically shows a process 30 for producing a distributor plate 1 for an electrochemical system by means of wet-chemical etching. Compared to the process of FIG. 1, wet-chemical etching 35 takes place here for structure formation 33. After the process step of mask formation 32, a mask 10, which is shown schematically in point form in FIG. 2, is formed on the first surface 3 of the metal foil 2. Etching 35 then takes place at the mask-free places 11 of the metal foil 2. The metal foil 2 is etched at the mask-free places 11 by the wet-chemical etching 35 or the structure formation 33, so that the metal foil 2 now has only a reduced thickness RD at a flat areal section 9 formed by etching. Raised regions 7 in the form of perpendicular pseudocircular cylinders have been formed under the mask 10. Mask removal 36 subsequently takes place, so that the mask 10 is removed from the top surfaces of the raised regions 7. The raised regions 7 and the first fluid distributor structure 5 formed thereby have a height H relative to the flat areal section 9 of from 0.1 µm to 100 µm, preferably from 1 µm to 20 µm. In other words, the first fluid distributor structure 5 has a depth T relative to the first surface 3 of the metal foil of from 0.1 µm to 100 µm, preferably from 1 µm to 20 µm. When the depth T of the first fluid distributor structure 5 is added to the reduced thickness RD of the metal foil 2 at the areal section 9, the thickness D of the metal foil 2 before etching 35 is obtained.

FIG. 3 schematically shows a process 30 only in the spot module of a band plant 20, with electrochemical coating 34 occurring. In the process step of mask formation 32, a prefabricated mask or structure pattern 10 is applied to the first surface 3 of the metal foil 2. The prefabricated mask 10 is shown shaded in FIG. 3, while mask-free places 11 are illustrated as open windows. In this way, the mask-free places 11 are electrochemically coated in the band plant 20. After the coating operation 34, the metal foil 2 can, for example, be conveyed to the right as a strip at a predetermined speed in the band plant 20, while the mask 10 can be held still over the metal foil 2. In this way, the still to be coated metal foil 2 is conveyed under the mask 10 and automatically coated, while the previously coated metal foil 2 is, for example, conveyed to the right. The coating operation 34 has formed raised regions 7 or a first fluid distributor structure 5 in the form of, for example, cuboids which are depicted hatched in FIG. 3. The raised regions 7 have a height H relative to the first surface 3 of the metal foil 2 of from 0.1 μm to 100 μm, preferably from 1 μm to 20 μm.

FIG. 4 schematically shows a process 30 merely in the spot module of a band plant 20, with wet-chemical etching 35 being used. Compared to FIG. 3, structure formation 33 is carried out by etching 35 here. Accordingly, no raised regions 7 but instead holes or depressions 8 in the form of cuboids are formed. The depressions 8 have a depth T relative to the first surface 3 of the metal foil 2.

What is claimed is:

1. A process (30) for producing a distributor plate (1) for an electrochemical system, wherein the distributor plate (1) has at least one metal foil (2) having a first surface (3) and a second surface (4), the process (30) comprising the following process steps:
    a) pretreatment (31) of the metal foil (2);
    b) mask formation (32) at least on the first surface (3) of the pretreated metal foil (2);
    c) structure formation (33) via electrochemical coating or wet-chemical or electrochemical etching at least on the first surface (3) of the metal foil (2) provided with the mask (10), as a result of which a raised first fluid distributor structure (5) is formed having a cylindrical or pseudocircular cylindrical shape; and
    d) mask removal (36).

2. The process (30) according to claim 1, characterized in that a second fluid distributor structure (6) is formed by the structure formation (33) on the second surface (4) of the metal foil (2).

3. The process (30) according to claim 1, characterized in that the pretreatment (31) of the metal foil includes chemical or electrochemical cleaning or degreasing.

4. The process (30) according to claim 1, characterized in that lithography or a prefabricated mask (10) is used in a band plant (20) for mask formation (32).

5. The process (30) according to claim 1, characterized in that the structure formation (33) is effected by electrochemical coating (34) or wet-chemical or electrochemical etching (35), with the structure formation (33) being effected by electrochemical coating (34) or wet-chemical or electrochemical etching (35) in the band plant (20).

6. The process according to claim 1, further including the step of structure formation via electrochemical coating or wet-chemical or electrochemical etching on the second surface of the metal foil, as a result of which a second fluid distributor structure is formed.

7. The process according to claim 1, wherein the distributor plate (1) has a thickness (D) of from 10 μm to 1000 μm.

8. The process according to claim 6, wherein the distributor plate (1) has a thickness (D) of from 100 μm to 200 μm,
    with the first fluid distributor structure (5) having a height (H) or depth (T) relative to the first surface (3) of the metal foil (2) of from 0.1 μm to 100 μm, and
    with the second fluid distributor structure (6) having a height (H) or depth (T) relative to the second surface (4) of the metal foil (2) of from 0.1 μm to 100 μm.

9. The process according to claim 6, wherein the distributor plate (1) has a thickness (D) of from 100 μm to 200 μm,
    with the first fluid distributor structure (5) having a height (H) or depth (T) relative to the first surface (3) of the metal foil (2) of from 1 μm to 10 μm, and
    with the second fluid distributor structure (6) having a height (H) or depth (T) relative to the second surface (4) of the metal foil (2) of from 1 μm to 10 μm.

* * * * *